US008531274B2

(12) United States Patent
Kiesel et al.

(10) Patent No.: US 8,531,274 B2
(45) Date of Patent: Sep. 10, 2013

(54) METHOD FOR ESTABLISHING A WIRELESS COMMUNICATION CONNECTION BETWEEN AN AUTOMATION COMPONENT AND A MOBILE OPERATING TERMINAL

(75) Inventors: Bruno Kiesel, Erlangen (DE); Joachim Scharnagl, Fürth (DE)

(73) Assignee: Siemens Aktiengesellschaft, München (DE)

( * ) Notice: Subject to any disclaimer, the term of this patent is extended or adjusted under 35 U.S.C. 154(b) by 505 days.

(21) Appl. No.: 12/598,661

(22) PCT Filed: May 3, 2007

(86) PCT No.: PCT/DE2007/000800
§ 371 (c)(1), (2), (4) Date: Nov. 3, 2009

(87) PCT Pub. No.: WO2008/134991
PCT Pub. Date: Nov. 13, 2008

(65) Prior Publication Data

US 2010/0079260 A1 Apr. 1, 2010

(51) Int. Cl.
*H04Q 5/22* (2006.01)
*H04B 5/00* (2006.01)

(52) U.S. Cl.
USPC ..... 340/10.51; 340/10.1; 340/10.3; 340/10.4; 340/10.5; 455/41.1

(58) Field of Classification Search
USPC .................... 340/10.1–10.6, 572.1; 455/41.1
See application file for complete search history.

(56) References Cited

U.S. PATENT DOCUMENTS

| | | | | |
|---|---|---|---|---|
| 6,892,052 | B2 | 5/2005 | Hussmann | |
| 7,565,108 | B2 * | 7/2009 | Kotola et al. | 455/41.2 |
| 7,613,426 | B2 * | 11/2009 | Kuehnel et al. | 455/41.2 |
| 7,650,135 | B2 * | 1/2010 | Twitchell | 455/343.3 |
| 7,769,927 | B2 * | 8/2010 | Dubs et al. | 710/58 |
| 7,848,826 | B2 * | 12/2010 | Gila et al. | 700/13 |
| 7,907,945 | B2 * | 3/2011 | Deprun | 455/432.1 |
| 7,969,953 | B1 * | 6/2011 | Breau et al. | 370/338 |
| 8,175,528 | B2 * | 5/2012 | He et al. | 455/41.2 |
| 2003/0119568 | A1 * | 6/2003 | Menard | 455/572 |
| 2004/0048570 | A1 | 3/2004 | Ayatsuka | |
| 2004/0203352 | A1 * | 10/2004 | Hall et al. | 455/41.1 |
| 2004/0205158 | A1 * | 10/2004 | Hsu | 709/218 |
| 2006/0063560 | A1 * | 3/2006 | Herle | 455/552.1 |
| 2006/0244565 | A1 * | 11/2006 | Friedrich et al. | 340/10.1 |
| 2007/0037567 | A1 * | 2/2007 | Ungless et al. | 455/422.1 |
| 2007/0075133 | A1 * | 4/2007 | Yeager | 235/380 |

FOREIGN PATENT DOCUMENTS

EP 1647869 A2 4/2006

* cited by examiner

*Primary Examiner* — Daniel Wu
*Assistant Examiner* — Muhammad Adnan

(57) ABSTRACT

A method for establishing a wireless communication connection between an automation component and a mobile operating terminal is provided. The automation component reads out a first request from a tag, wherein the operating terminal has stored the first request on the tag using a read/write device, the operating terminal requesting information from the automation component by the first request via wireless communication connections provided by the automation component. The automation component stores the information via the wireless communication connection on the tag and then reads out a second request from the tag, wherein the operating terminal has stored the second request on the tag, the establishment of a first communication connection being requested in the second request. Further, a first communication module of the automation component intended for the first communication connection is activated, the operating terminal then establishing the first communication connection to the automation component.

20 Claims, 2 Drawing Sheets

METHOD FOR ESTABLISHING A WIRELESS COMMUNICATION CONNECTION BETWEEN AN AUTOMATION COMPONENT AND A MOBILE OPERATING TERMINAL

CROSS REFERENCE TO RELATED APPLICATIONS

This application is the US National Stage of International Application No. PCT/DE2007/000800 filed May 3, 2007, claims the benefit thereof and is incorporated by reference herein in its entirety.

FIELD OF INVENTION

The invention relates to a method for establishing a wireless communication connection between an automation component and a mobile operating terminal and to computer programs for carrying out the method. The invention also relates to an automation component, a mobile operating terminal and an automated system.

BACKGROUND OF INVENTION

In an automated system data is usually transmitted between a wide variety of automation components in the system. The automation components can, for example, be stored programmable controllers, numerical controllers, field bus components of a decentralized peripheral or field devices. The data, for example identification information, which is permanently stored on the respective automation component, or parameterization data and operating data, are usually transmitted via a direct, electrical connection, for example Profibus or Ethernet.

Alternatively a mobile operating terminal can read out the data from an automation component via a wireless communication connection, for example a WLAN, Bluetooth or ZigBee connection. However, each automation component must comprise a communication module for this purpose, via which such a connection to a mobile operating terminal may be achieved. Wireless communication connections, such as WLAN or Bluetooth, are generally known. In this case a connection is generally established according to what is known as the "discover principle". Here each component that is capable of communication sends what is referred to as a broadcast signal, via which this component can be discovered by another component that is capable of communication. A user can therefore search the surroundings for components that are capable of communication and have these displayed. If required, a connection can then be established with one of the displayed components.

SUMMARY OF INVENTION

In the industrial field many constantly active radio components, which send a broadcast signal, are undesirable for two reasons. Firstly, a constant broadcast, necessary for discovering components that are capable of communication, is disruptive, and precisely in the often very high number of such components in an automated system owing to the high density of automation components which provide such a communication connection. Secondly, for security reasons it should not be possible to discover automation components very easily, and therewith be able to access them very easily. Furthermore, for security reasons it must also be ensured that the user, who is operating the automated system, is connected to the correct component.

An object of the invention is to disclose improved methods for establishing a wireless communication connection between an automation component and a mobile operating terminal. A further object of the invention is to disclose a corresponding improved automation component and a correspondingly improved mobile operating terminal.

The objects are each achieved by the features of the independent claims. Preferred embodiments and developments of the invention are found in the respective dependent claims.

According to the invention a method for establishing a wireless communication connection between an automation component and a mobile operating terminal is disclosed. According to the method the automation component reads out a first request from a first tag, the operating terminal having stored the first request on the tag using a read/write device, the operating terminal requesting by means of the first request information from the automation component about wireless communication connections that can be provided by the automation component. In a further method step the automation component stores the information about the wireless communication connections on the tag. The automation component then reads out a second request from the tag, the operating terminal having stored the second request on the tag and establishment of a first communication connection being requested in the second request. The automation component then activates a first communication module which is provided for the first communication connection and therefore allows the operating terminal to establish the first communication connection.

The tag can be an RFID tag or an NFC tag. Such tags are also called transponders, labels, smart tags, smart labels, radio chips or radio labels. The acronym RFID stands for Radio Frequency Identification and refers to a technology which allows automatic identification or radio recognition and localization of the tags. A read/write device provided for this purpose can wirelessly read out data from an RFID tag and store data on the RFID tag. Data is transmitted between transponder and reader by means of electromagnetic waves. Typically the electromagnetic waves have frequencies in the radio frequency range (RF range) where RFID technology is used.

The acronym NFC stands for Near Field Communication and refers to a wireless communication technology for data connections across short distances and via an electromagnetic near field. NFC technology is based on the combination of RFID and wireless connection technology. It operates in a frequency range of 13.56 MHz and provides a data transmission rate of a maximum of 424 kbit/second with a range of just 20 cm.

To initialize establishment of a wireless communication connection to the automation component the operating terminal sends a first request to the tag, and this is registered in the tag. If the automation component, which can be connected to the tag via an electrical connection, reads out the tag then it detects that the operating terminal has stored the first request on the tag. In the process the operating terminal signals that it wants information about wireless communication connections that the automation component can provide. The automation component then stores this information on the tag, so it can be read out by the operating terminal. Via the second request, which is stored on the tag, the operating terminal informs the automation component that the first communication connection has been selected from the possible communication connections. The previously deactivated first communication module, via which the first communication connection can be provided by the automation component, is then activated.

The first communication module is deactivated until the first communication connection is to be provided for the operating terminal. This has the advantage that a plurality of automation components with communication modules can be supported relatively close to one another, for example in an automated system, without the individual communication modules regularly emitting broadcast signals. This means that otherwise incompatible radio technologies can also co-exist even with a high density of such automation components. "RF contamination" or "HF contamination" (RF: radio frequency, HF: high frequency) of the surroundings by signals emitted via the broadcasts of a plurality of communication modules is avoided, or at least significantly reduced, in the process.

A further advantage of the inventive method is that establishment of a wireless communication connection by means of the tag and read/write device, which communicate with one another on the basis of RFID technology or NFC technology, is initialized. As the range is limited when using RFID or NFC technology, the mobile operating terminal must be physically brought into the vicinity of the device or tag to be operated. This facilitates selection of the automation component with which the communication connection is to be established and prevents selection of an incorrect device as indirect selection by way of addresses or names or the device is omitted.

As the first communication module is deactivated until the first communication connection to the operating terminal is to be established, it does not send a broadcast signal before establishment of the communication connection either and is therefore not visible to other read/write devices. Access security to the automation component via a wireless communication connection using the communication module is increased thereby. A special read/write device, which is capable of communication with the RFID tag, is required moreover for establishing a connection.

A person skilled in the art is obviously clear about the fact that "communication" also takes place between the tag and the operating terminal and therefore in a certain sense a "communication connection" is also established between the tag and the operating terminal. Within this document the term "communication connection" will however only be used for the superior communication connections that are established between a communication module of the automation components and the operating terminal.

According to one embodiment of the invention the first communication module is deactivated following termination or disconnection of the first communication connection between the automation component and the mobile operating terminal. This ensures that the first communication module is substantially only activated if the first communication connection is thereby provided for an operating terminal. Otherwise it is deactivated and does not contribute to "HF contamination" of the surroundings therefore.

According to one embodiment of the invention, after receiving the second request the automation component stores connection information relating to the first communication connection on the tag. The operating terminal then reads out the connection information from the tag and acknowledges reading out of the connection information on the tag. The connection information provides the information for the operating terminal that it requires for establishing the first communication connection with the activated first communication module.

According to one embodiment of the invention the connection information about the first communication connection is included in the information about the wireless communication connections. The connection information can accordingly be separately stored on the tag for the operating terminal following receipt of the second request, or can be directly integrated in the information that the automation component stores on the tag following receipt of the first request.

According to one embodiment of the invention the tag is initialized before receipt of the first request. The automation component also puts the tag in the initial state again following reading out of the second request or following acknowledgement of reading out of the connection information by the operating terminal.

According to one embodiment of the invention the tag is initialized before receipt of the first request. The tag is initialized again following successful deactivation of the first communication module. Whereas the first communication connection for the first operating terminal is provided via the first communication module, the tag remains associated with the first communication module. A different operating terminal cannot establish a communication connection, for example a second communication connection via a second communication module, with the automation component via this tag therefore.

According to one embodiment of the invention the read/write device writes a predefined value in the tag by means of the first request, the predefined value signaling to the automation component that the operating terminal wants to receive information about communication connections of the automation component that can be provided. The automation component can regularly scan the tag. As long as it is in the initialized state the automation component recognizes that no operating terminal has stored a first request on the tag. According to this embodiment the first request corresponds to a predefined value which is written in the tag by the read/write device. If the automation component reads out the tag, it detects the predefined value and, as described above, the information for the operating terminal is then stored on the tag.

According to one embodiment of the invention a set of communication connections can be provided by the automation component. The information about wireless communication connections, which the automation component stores in the tag for the operating terminal, can relate to all communication connections from the set of communication connections, or, alternatively, the information about wireless communication connections, which the automation component stores in the tag for the operating terminal, can relate to a selection of communication connections from the set of communication connections.

According to one embodiment of the invention the automation component selects communication connections by using predefined parameters, and/or an application program and/or the type of operating terminal.

According to one embodiment of the invention each of the communication connections can be provided via a different communication module of the automation component. Therefore the first communication connection can be provided via the first communication module, whereas for example a second communication connection can be provided via a second communication module. The second communication module, like every other communication module of the automation component, is deactivated, however, until an operating terminal requests provision of the second communication connection for communication with the automation component.

According to one embodiment of the invention receipt of the first request and/or storage of information on the tag and/or receipt of the second request and/or activation of the first communication module and/or deactivation of the first communication module by the automation component is/are displayed by means of one or more optical signal(s). The optical signals are produced by at least one light source, such as an LED (Light Emitting Diode) or the like. The optical response of the automation component by means of the optical signal ensures that the person operating the operating terminal receives a response from the addressed automation component, and this ensures the correct choice of device in the case of a high density of devices. On the other hand the current state of connection establishment is signaled to the user, for example if, as described above, for every step that is carried out to establish the connection, the color of the light source changes or the light source is operated in a different mode.

For example it can be signaled via an LED whether communication is taking place in the near range (RFID) or whether the first communication connection (for example Bluetooth) is already established in that the LED is off if no communication is active and the LED flashes slowly if communication is taking place in the near range between the read/write device and the tag. If the LED flashes quickly the first communication connection is established between the operating terminal and the automation component. The LED is permanently switched on to show that the first communication connection is fully established.

According to one embodiment of the invention the automation component, when registering the first request, scans at least one sensor, the steps following registration of the first request only being carried out by the automation component if the at least one sensor detects a signal. The sensor can, for example, be an optical sensor or a pressure sensor. An additional input can therefore take place via the sensor, for example in the case of an optical sensor (photodiode) via a specially modulated laser pointer, for clear identification of the automation component. As described above, the method for establishing a connection between the automation component and the operating terminal will therefore only be continued if a first request is detected in the tag and input via the sensor is detected. This has the advantage that even with a very high density of automation components the operator of the operating terminal communicates with the correct automation component using the operating terminal and establishes the first communication connection with the correct automation component.

According to one embodiment of the invention the wireless communication connections are for example WLAN (IEEE 802.11), WIMAX (IEEE 802.16), ZigBee (IEEE 802.15.4) or Bluetooth connections (IEEE 802.15.1).

According to one embodiment of the invention the tag is an RFID tag or an NFC tag.

According to one embodiment of the invention it is a passive tag or an active tag. Passive tags do not have their own power supply and take the power required for their operation from the electromagnetic field that the read/write device emits. Active tags have their own power supply by contrast.

According to the invention a further method for establishing a wireless communication connection between the automation component and the mobile operating terminal is disclosed, the method being performed by the operating terminal. According to the method the operating terminal sends a first request to a tag using a read/write device, wherein the tag can be read out by the automation component. The operating terminal also reads out the tag, the operating terminal receiving information about wireless communication connections, wherein the wireless communication connections can be provided by the automation component, the information having been stored on the tag by the automation component on the basis of the first request. The mobile operating terminal then selects a first communication connection from the wireless communication connections and sends a second request to the tag using the read/write device, selection of the first request being displayed to the automation component with the second request. The first communication connection to a first communication module of the automation component is then established, the first communication module having been activated by the automation component on the basis of the second request and the first communication module being provided to supply the first communication connection.

In a further aspect the invention relates to computer program products with instructions that can be executed by a computer for carrying out the inventive method.

In a further aspect the invention relates to an automation component comprising a tag and a communication module.

In a further aspect the invention relates to a mobile operating terminal comprising a read/write device for a tag.

In a further aspect the invention relates to an automated system comprising at least one inventive automation component and at least one inventive operating terminal.

BRIEF DESCRIPTION OF THE DRAWINGS

Preferred embodiments of the invention will be described in more detail below with reference to the drawings, in which.

DETAILED DESCRIPTION OF INVENTION

Figure 1:
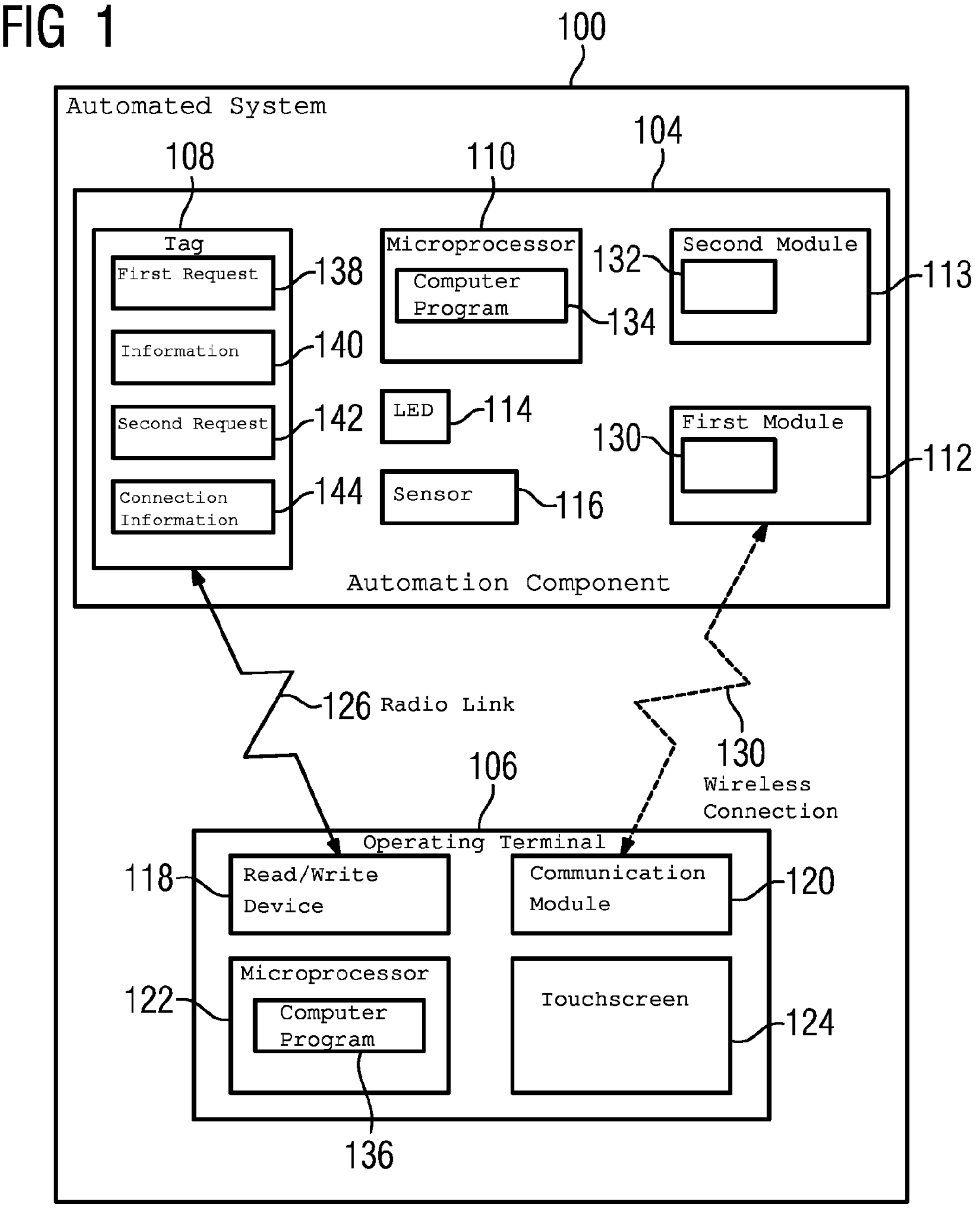
FIG. 1 shows a schematic block diagram of an automated system.

FIG. 1 shows a schematic block diagram of an automated system 100. The automated system 100 comprises an automation component 104 and an operating terminal 106 for the automation component 104.

The automation component 104 comprises a tag 108, a microprocessor 110, a first communication module 112 and a second communication module 113. The automation component 104 also has an LED 114 and a sensor 116.

The operating terminal 106 comprises a read/write device 118, a communication module 120, a microprocessor 122 and a touchscreen 124. The read/write device 118 is provided for wireless communication with the tag 108. The tag 108 is for example an MD tag and the read/write device 118 is accordingly a read/write device for an RFID tag. The read/write device 118 sends electromagnetic waves via an antenna and these are received by the tag 108. Data can be transported via the electromagnetic waves to the tag 108 and be stored for example thereon. The range for an RFID connection is between a few centimeters and several hundred meters. It substantially depends on the local conditions and the transmitting power of the signals emitted by the read/write device 118. The tag 108 itself does not emit electromagnetic signals. It can only be read out by the read/write device 118 using a radio link 126.

The first communication module 112 is provided to supply a wireless first communication connection 130. The second communication module 113 is provided to supply a wireless second communication connection 132. A WLAN connection for example can be provided for the operating terminal 106 via the communication module 112 to the automation component 104 by the first communication connection 130, while a Bluetooth connection for example can be provided via the communication module 113 to the automation component 104 by the second communication connection 132.

For communication with the automation component 104 via one of the communication connections 130, 132 the operating terminal 106 comprises the communication module 120 which is used by the operating terminal 106 for wireless communication to the automation component.

The communication module 112 remains deactivated by the automation component 104 until the first communication connection 130 is to be provided for an operating terminal. The same applies to the second communication module 113.

The microprocessor 110 of the automation component 104 [executes] a computer program 134. The microprocessor 122 of the operating terminal 106 also executes a computer program product 136 for establishing a communication connection with the communication module 112 of the automation component 104.

To establish a communication connection between the automation component 104 and the operating terminal 106 the read/write device 118 sends a first request to the tag 108, and this is stored on the tag 108. Initialized by the computer program product 134 the tag 108 is regularly read out, or read out at irregular intervals, so the first request 138 is registered by computer program product 134. The operating terminal 106 requests information about wireless communication connections, which can be provided by the automation component 104, via the first request 138.

The computer program product 134 then stores information 140 about the first communication connection 130 and the second communication 132 on the tag 108. The read/write device 118 can read out the information 140 from the tag, whereby the information 140 is available to the operating terminal 106. The computer program product 136 can then provide the information to an operator of the operating terminal 106 via the touchscreen 124, so the person can select between the first communication connection 130 (WLAN connection) and the second communication connection 132 (Bluetooth connection) via the touchscreen. If, for example, the operator selects the first communication connection 130 via the touchscreen 124, this is registered by computer program product 136. The computer program product 136 also initializes sending of a second request 142 using the read/write device 118.

Alternatively the operating terminal 106 can internally select one of the first or second communication connections that can be provided by the automation component. By way of example, the communication module 120 can be a WLAN card, so the operating terminal can only establish the first communication connection 130 anyway.

The second request 142 is stored on the tag 108. With the second request 142 the automation component is informed that the operating terminal 106 wants to establish the first communication connection 130. The second request 142 is read out by the computer program product 134. The computer program product 134 then stores connection information 144 on the tag 108. The connection information includes information for the operating terminal 106 necessary for establishing the first communication connection 130. The read/write device 118 reads out the connection information 144 and acknowledges reading out of the connection information 144. After the computer program product 134 has detected acknowledgement of reading out of the connection information 144 the communication module 112, via which the first communication connection 130 can be provided, is activated.

The computer program product 136 of the operating terminal 106 can also initialize establishment of the first communication connection 130 between communication module 120 and communication module 112 by the operating terminal 106 using the connection information 144.

Following termination or disconnection of the first communication connection 130 the first communication module 112 is deactivated by the automation component 104, so the first communication module 112 no longer sends and therefore does not contribute to "RF/HF contamination" in the surroundings of the automated system 100. The tag 108 is also initialized again following deactivation of the first communication module 112. A new first request from an operating terminal for establishing a communication connection can therefore be detected via the tag 108 by the computer program product 134.

To establish the first communication connection 130 a plurality of steps are run by the automation component 104 and by the operating terminal 106. To signal to the operator of the operating terminal 106 that the automation component 104 is actually running steps for establishing the first communication connection 130, automation component 104 uses LED 114. By way of example the LED 114 can be switched off as long as no first request 138 is detected by the automation component 104. Following receipt or detection of the first request 138 the LED 114 can be switched to a slow flashing mode. Following receipt of the second request 142 the LED 114 can be switched to a fast flashing mode. As soon as the first communication module 112 is activated, and therefore a broadcast signal relating to the first communication connection 130 is emitted by the first communication module 112, the LED 114 can, for example, be permanently switched on. It is thereby signaled to the operator of the operating terminal 106 that it is now possible to establish the first communication connection to the first communication module 112 via communication module 120.

The sensor 116 can, for example, be an optical sensor, such as a photodiode. After reading out the first request 134, the computer program product 134 can scan the sensor and thereby determine whether the sensor is detecting a signal, for example a specially modulated signal from a diode laser. Information 140 is only provided if this signal is detected by the sensor. The laser signal can be directed onto the sensor by the operator of the operating terminal 106. This ensures that the operator also actually takes up communication with automation component 104 with which it wants to and does not, for instance using the read/write device, activate a tag which is being read out by another automation component.

Figure 2:
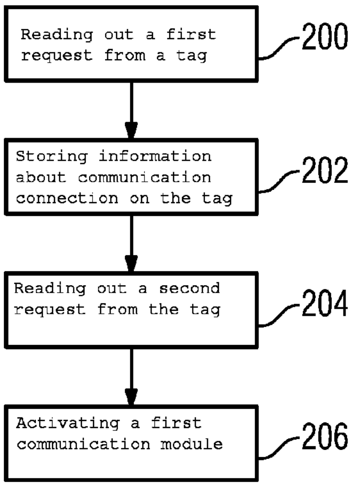
FIG. 2 shows a flow diagram depicting the steps of an inventive method.

FIG. 2 shows a flow diagram depicting steps of an inventive method for establishing a wireless communication connection between an automation component and a mobile operating terminal. The method is performed by the automation component. According to step 200 of the method a first request is read out from a tag, the operating terminal having stored the first request on the tag using a read/write device, the operating terminal requesting information from the automation component about wireless communication connections which are from the automation component by means of the first request. In step 202 the information about the wireless communication connections is stored on the tag. In step 204 the automation component reads out a second request from the tag, the operating terminal having stored the second request on the tag, the establishment of a first communication connection being requested in the second request, and the first communication connection having been selected from the wireless communication connections by the operating terminal. In step 206 a first communication module of the automation component is activated on the basis of the second request, the first communication module being provided to supply the first communication connection.

Figure 3:
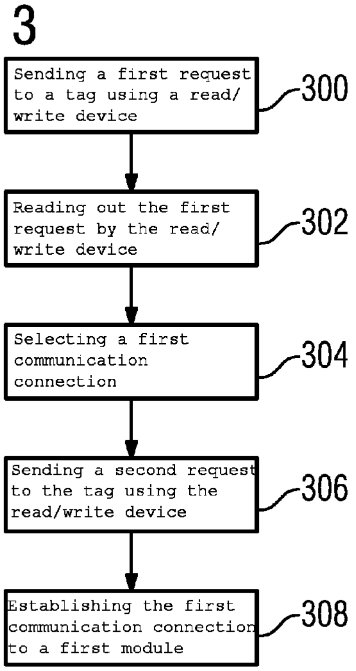
FIG. 3 shows a further flow diagram depicting the steps of an inventive method.

FIG. 3 shows a further flow diagram depicting steps of an inventive method for establishing a wireless communication connection between an automation component and an operating terminal. The method is performed by the operating terminal. According to step 300 of the method a first request is sent to a tag using a read/write device of the mobile operating terminal, it being possible to read out the tag using the automation component. In step 302 the tag is read out by the read/write device, the operating terminal receiving information about wireless communication connections, wherein the wireless communication connections can be provided by the automation component and the information having been stored on the tag by the automation component on the basis of the first request. In step 304 a first communication connection is selected from the wireless communication connections. In step 306 a second request is sent to the tag using the read/write device, the selection of the first communication connection being communicated with the second request. In step 308 the first communication connection to a first communication module of the automation component is established, the first communication module having been activated by the automation component on the basis of the second request and being embodied to provide the first communication connection.

Figure 4:
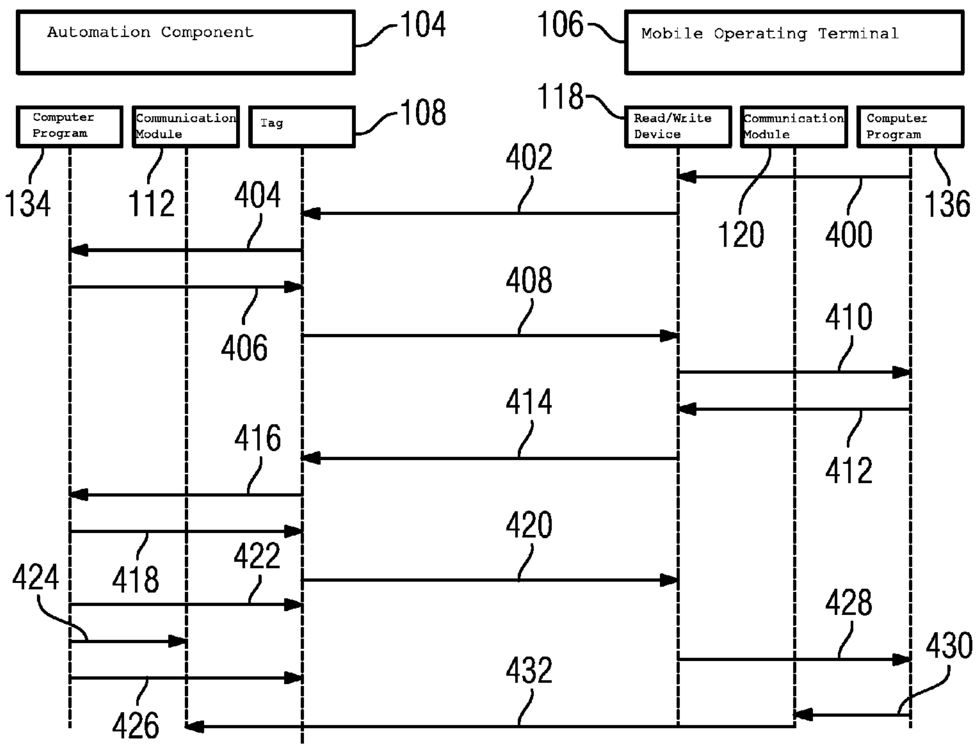
FIG. 4 shows a flow chart schematically depicting the course of the inventive method for establishing a wireless communication connection between an automation component and a mobile operating terminal.

FIG. 4 shows a flow chart schematically depicting the course of the inventive method for establishing a wireless communication connection between the automation component 104 and the mobile operating terminal 106 from FIG. 1. The automation component 104 comprises the computer program product 134 for controlling the method steps carried out by automation component 104. The automation component 104 also comprises the first communication module 112 and the tag 108. The operating terminal 106 comprises the read/write device 118, the communication module 120 and the computer program product 136 for controlling the method steps carried out by the operating terminal. The first communication module 112 of the automation component 104 should initially be deactivated and the tag 108 is in an initial state.

In step 400 the computer program product 136 instructs the read/write device 118 to store a first request on the tag 108. In step 402 the read/write device 118 writes a first value in the tag 108 via an air interface, so the tag 108 is no longer in the initial state. The computer program product 134 regularly reads out the tag 108 and therefore detects in step 404 that the tag 108 is no longer in the initial state. In response thereto, the computer program product 134 stores information in step 406 about wireless communication connections which can be provided (the first communication connection 130 and the second communication connection 132, cf. FIG. 1) on the tag 108.

In step 408 the read/write device 118 reads out the tag and in step 410 depicts the information on the computer program product 136. Using the information the computer program product 136 selects the first communication connection from the wireless communication connections. In step 412 the computer program product 136 communicates to the read/write device 118 that a link with the automation component is desired via the first communication connection. In step 414 the read/write device stores on the tag 108 the information that the first communication connection should be established.

In step 416 the computer program product 136 reads out from the tag 108 that the operating terminal 108 wants the first communication connection to be established. In step 418 the computer program product 134 stores connection information about the first communication connection on the tag 108, the information being read out by the read/write device in step 420, and this being acknowledged on the tag 108 by the read/write device. In step 422 the computer program product 134 detects the acknowledgement and in step 424 then activates the first communication module 112 and in step 426 initializes the tag 108. In step 428 the connection information is passed from the read/write device to the computer program product 136 which transmits the connection information to communication module 120 in step 430. In step 432 the first communication connection to the activated first communication module 112 is then established from communication module 120.

The invention claimed is:

1. A method for establishing a wireless communication connection between an automation component and a mobile operating terminal, the method being performed by the automation component, comprising:

reading out a first request from a tag by the automation component, the operating terminal having stored the first request on the tag using a read/write device, the operating terminal requesting by the first request information from the automation component about wireless communication connections provided by the automation component;

storing information about the wireless communication connections on the tag by the automation component;

reading out a second request from the tag by the automation component, the operating terminal having stored the second request on the tag, a first communication connection being requested in the second request in order to establish the wireless communication connection; and activating a first communication module of the automation component based upon the second request, the first communication module being provided to supply the first communication connection.

2. The method as claimed in claim 1, wherein the first communication module is deactivated following termination or disconnection of the first communication connection.

3. The method as claimed in claim 1, wherein, after receiving the second request, connection information relating to the first communication connection is stored on the tag, wherein the operating terminal acknowledges reading out of the connection information and wherein the first communication connection is established by the operating terminal based upon the connection information using the activated first communication module.

4. The method as claimed in claim 1, wherein connection information about the first communication connection is included in the information about the wireless communication connections.

5. The method as claimed in claim 1, further comprising:

initializing the tag before receipt of the first request, wherein the automation component initializes the tag again following reading out of the second request or following acknowledgement of reading out of the connection information by the operating terminal, or wherein the tag is initialized after successful deactivation of the first communication module.

6. The method as claimed in claim 1, wherein by the first request the read/write device writes a predefined value in the tag, the predefined value signaling to the automation component that the operating terminal wants to receive information about communication connections of the automation component that can be provided.

7. The method as claimed in claim 1, wherein a set of communication connections are provided by the automation component, wherein the information about wireless communication connections, which the automation component stores in the tag for the operating terminal, relates to all communication connections from the set of communication connections or wherein the information about wireless communication connections, which the automation component stores in the tag for the operating terminal, relates to a selection of communication connections from the set of communication connections.

8. The method as claimed in claim 7, wherein the automation component selects communication connections by using predefined parameters, an application program or the type of operating terminal.

9. The method as claimed in claim 1, wherein receipt of the first request and/or storage of information on the tag and/or receipt of the second request and/or activation of the first communication module and/or deactivation of the first communication module are displayed by one or more optical signals by the automation component.

10. The method as claimed in claim 9, wherein the optical signals are produced by an LED.

11. The method as claimed in claim 1, wherein, when registering the first request, the automation component scans a sensor, wherein the steps following registration of the first request are only carried out by the automation component when the sensor detects a signal.

12. The method as claimed in claim 11, wherein the sensor is an optical sensor or a pressure sensor.

13. The method as claimed in claim 1, wherein the communication connections include the first communication connection and a second communication connection, wherein the first communication connection is provided via the first communication module, wherein the second communication connection is provided via a second communication module, and wherein the second communication module is only activated to provide the second communication connection.

14. The method as claimed in claim 1, wherein the wireless communication connections are WLAN (IEEE 802.11), WIMAX (IEEE 802.16), ZigBee (IEEE 802.15.4) and/or Bluetooth connections (IEEE 802.15.1) or the like, wherein the tag is an RFID tag or an NFC tag.

15. A method for establishing a wireless communication connection between an automation component and a mobile operating terminal, the method being performed by the operating terminal, comprising:

sending a first request to a tag using a read/write device;

reading out the tag using the read/write device, the operating terminal receiving information about wireless communication connections, wherein the communication connections are provided by the automation component, the information having been stored on the tag by the automation component based upon the first request;

selecting a first wireless communication connection from the wireless communication connections;

sending a second request to the tag using the read/write device, the selection of the first communication connection being displayed to the automation component with the second request; and establishing the first wireless communication connection to a first communication module of the automation component, the first communication module having been activated by the automation component based upon the second request.

16. The method as claimed in claim 15, wherein, before establishing the first communication connection, the tag is read out using the read/write device, wherein the operating terminal receives connection information about the first communication connection, wherein the connection information from the automation component has been stored on the tag based upon the second request.

17. The method as claimed in claim 15, wherein the information about the wireless communication connections is displayed to an operating terminal user, wherein the user selects the first communication connection.

18. The method as claimed in claim 15, wherein the operating terminal automatically selects the first communication connection when the automation component only provides information about the first communication connection or when it is only possible for the operating terminal to establish the first communication connection.

19. An automation component, comprising:

a tag;

a first communication module;

means for reading out a first request from the tag by the automation component, wherein an operating terminal has stored the first request on the tag using a read/write device, wherein, by the first request, the operating terminal requests information from the automation component about wireless communication connections which can be provided by the automation components;

means for storing the information about the wireless communication connections on the tag by the automation component;

means for reading out a second request from the tag by the automation component, wherein the operating terminal has stored the second request on the tag, wherein a first communication connection is requested in the second request to establish the wireless communication connection, wherein the first communication connection is provided by the first communication module; and means for activating and deactivating the first communication module.

20. The automation component as claimed in claim 19, further comprising:

means for storing connection information relating to the first communication connection on the tag;

means for registering acknowledgement of reading out of the connection information by the operating terminal;

means for initializing the tag;

means for selecting the communication connections from a set of communication connections, the communication connections of the set of communication connections being provided by the automation component via the corresponding communication modules, wherein the communication connections include at least the first communication connection and a second communication connection, the first communication connection being provided via the first communication module and the second communication connection being provided via a second communication module, wherein the second communication module is only activated to provide the second communication connection;

means for producing one or more optical signals for signaling receipt of the first request and/or storage of information on the tag and/or receipt of the second request and/or activation of the first communication module and/or deactivation of the first communication module; and a sensor, wherein the sensor is an optical sensor or a pressure sensor.

* * * * *